REEL WITH AUTOMATICALLY CLOSING AND LOCKING WINDOW MEANS

Filed April 5, 1963 3 Sheets-Sheet 1

INVENTORS
OTTO MORNINGSTAR,
FRANK H. BURGESS, &
GREGORY MATHUS
BY Ezekiel Wolf, Wolf & Greenfield
ATTORNEYS June 15, 1965 O. MORNINGSTAR ETAL 3,189,294

REEL WITH AUTOMATICALLY CLOSING AND LOCKING WINDOW MEANS

Filed April 5, 1963 3 Sheets-Sheet 2

INVENTORS
OTTO MORNINGSTAR,
BY FRANK H. BURGESS, &
GREGORY MATHUS.
Ezekiel Wolf, Wolf & Greenfield
ATTORNEYS INVENTORS
OTTO MORNINGSTAR,
FRANK H. BURGESS, +
GREGORY MATHUS
BY Ezekiel Wolf, Wolf + Greenfield
ATTORNEYS 3,189,294

REEL WITH AUTOMATICALLY CLOSING AND LOCKING WINDOW MEANS

Otto Morningstar, Brookline, and Frank H. Burgess, Somerset, Mass., and Gregory Mathus, West Hartford, Conn., assignors to Morningstar Corporation, Cambridge, Mass., a corporation of Massachusetts Filed Apr. 5, 1963, Ser. No. 270,975
3 Claims. (Cl. 242—71.8)

This invention relates to a new and improved reel for storing tape and film.

Reels for storing tape and film are conventionally provided with one or more windows or openings in the reel flanges through which the fingers may be inserted to thread manually one or more turns of the tape or film on the reel hub before the winding is done automatically. While it is essential in the absence of some automatic threading device to provide at least one opening for access to the hub, such openings have several disadvantages. Through such openings, operators handling loaded reels accidentally touch the tape or film and their fingernails damage the tape or film edges. Furthermore, through such openings, air-borne and finger-borne dirt is deposited on the tape or film. In high-speed equipment and during rewinding operations which are conducted at high speeds, wind currents are established in the reels between the flanges as a result of the openings, which cause film and tape to wind unevenly.

One important object of this invention is to provide a closure for the window openings in the flanges of reels so that only during those periods when access to the interior of the reel is required need the openings actually be open.

Another important object of this invention is to provide a reel having a window opening which automatically closes in response to motion of the reel.

Still another important object of this invention is to provide a reel having a window which automatically locks closed in response to motion of the reel and which may be opened manually by a purposeful simple manipulation.

Still another important object of this invention is to provide a reel which accomplishes the above noted objects and which further indicates how it is to be mounted on a spindle when in use, exposes the full width of the tape or film wound on it so that its condition may be observed, indicates the quantity of film or tape wound on it, and provides maximum protection for the tape or film wound on it by preventing accidental crimping or tearing of the tape or film edges and depositing of dirt on its contents.

To accomplish these and other objects, the reel of this invention includes among its features a hub and a pair of spaced parallel flanges. An opening is provided in one of the flanges for enabling an operator to thread the leading end of tape or film about the hub, and a cover is movably mounted on the reel for closing the opening when access to the region between the flanges is not required.

These and other objects and features of this invention will be better understood and appreciated from the following detailed description of several embodiments thereof, selected for purposes of illustration and shown in the accompanying drawing, in which.

Figures 1, 4:
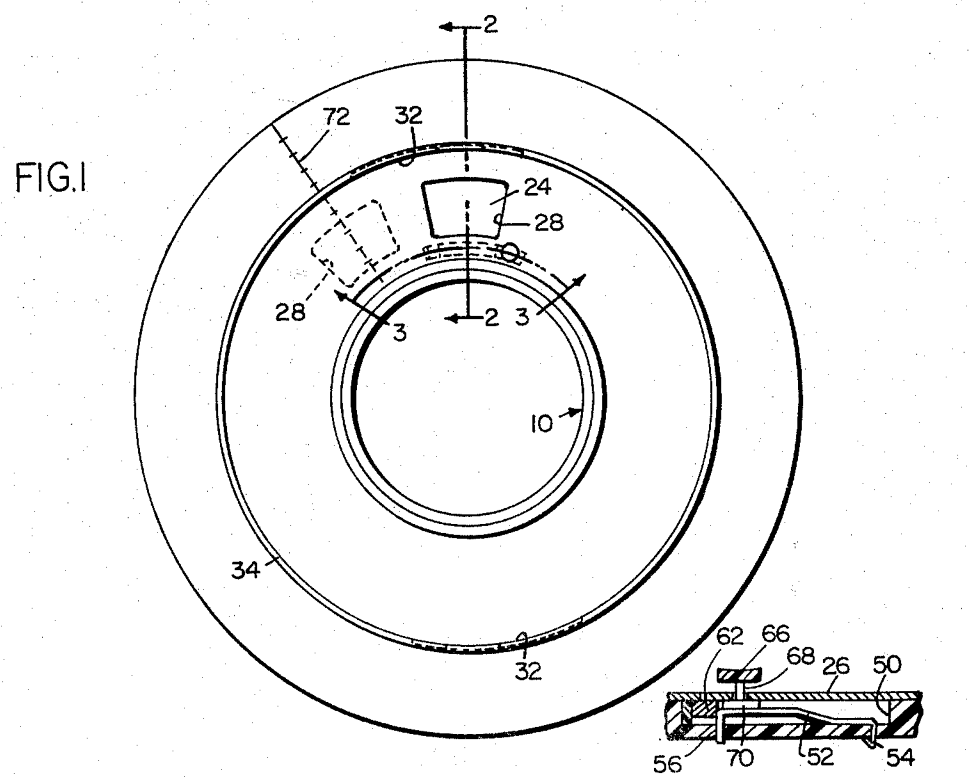
FIG. 1 is a side view of a reel constructed in accordance with this invention.
FIG. 4 is a fragmentary detailed view of the reel shown in FIG. 1 with the lock in the closed position.

The reel shown in FIGS. 1–5 includes a hub 10 and a pair of substantially parallel flanges 12 and 14. As suggested in the drawing the reel is molded of plastic material and includes two major parts; namely, one part which includes the flange 12, the inner hub wall 16 and the outer hub wall 18 upon which the film or tape carried by the reel is wound, and the second part which includes the flange 14 and the shoulders 20 and 22 that fit between the walls 16 and 18 and are cemented thereto to form the unitary structure.

Figure 2:
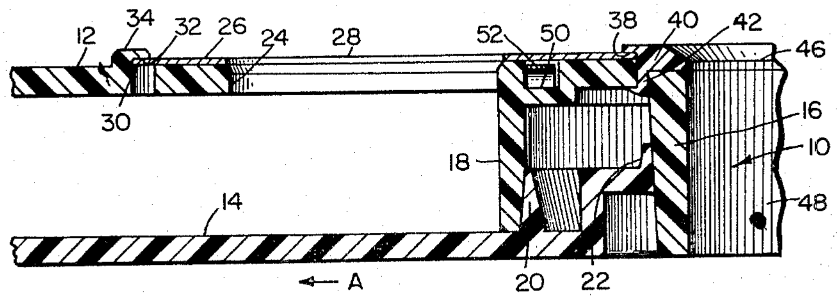
FIG. 2 is a cross-sectional view taken along the section line 2—2 in FIG. 1.
Figure 3:
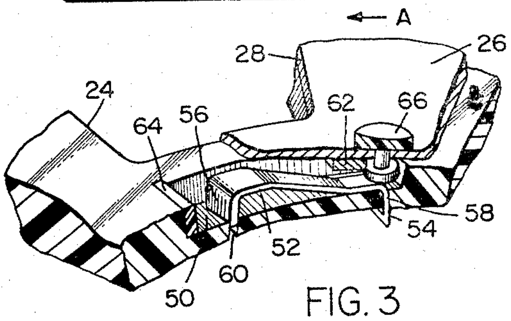
FIG. 3 is a fragmentary perspective view of a portion of the reel shown in FIG. 1, looking in the direction of sight line 3—3 of FIG. 1.
Figure 5:
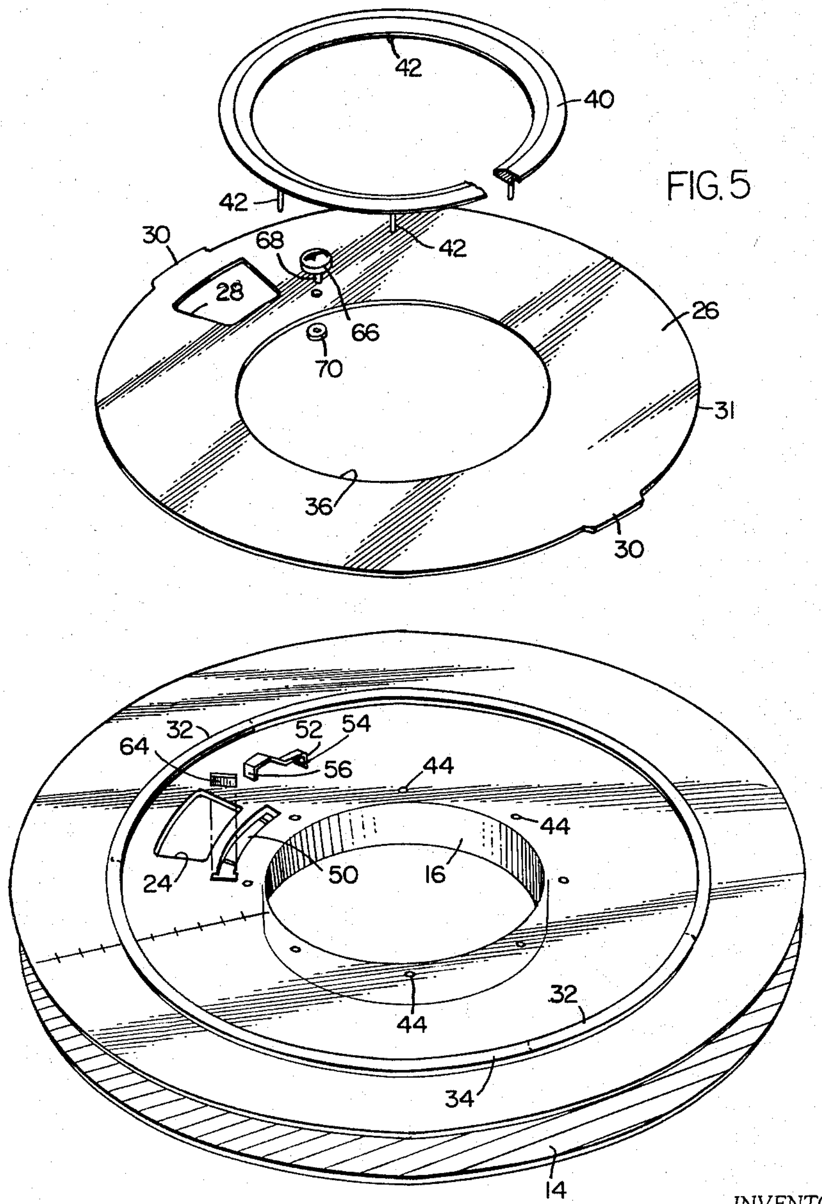
FIG. 5 is an exploded view of the reel shown in FIGS. 1–4.
Figures 6, 7, 8, 9:
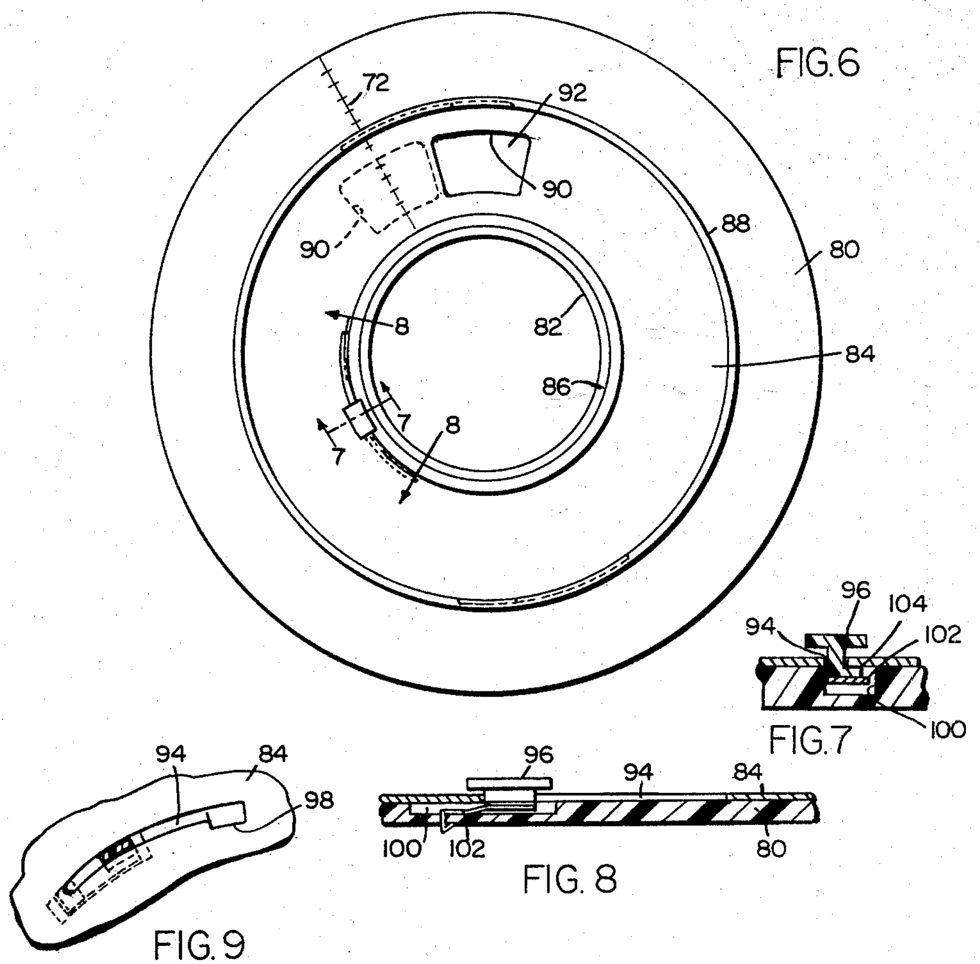
FIG. 6 is a side view of another embodiment of a reel constructed in accordance with this invention.
FIGS. 7 and 8 are cross-sectional views taken along the corresponding section lines in FIG. 6.
FIG. 9 is a fragmentary detailed view of the lock of the reel shown in FIGS. 6–8.

In FIGS. 2, 3 and 5 a window opening 24 is shown provided in the flange 12 outwardly of the wall 18 of the hub, which opening 24 is adequate in size to allow a man to insert his fingers so that he can manually wind one or more turns of the tape or film about the reel while the reel is on its spindle and before it is automatically driven by the machine with which it is used. A thin annular plate 26 made of aluminum or some other comparable material is mounted on the flange 12 and overlies the opening 24 in the flange. The plate or ring 26 is supported on the flange 12 for rotational movement about its own axis and is provided with an opening 28 that conforms in shape to the window opening 24. When the opening 28 in the plate 26 is aligned with the opening 24, access is provided to the interior of the reel between the flanges 12 and 14, but when the plate 26 is turned with respect to the flange so that the openings 24 and 28 are no longer aligned, the plate 26 serves as a closure for the opening to prevent access to the space between the flanges.

The plate 26 has a pair of ears 30 extending outwardly from the outer edge 31 of the plate which ears fit within channels 32 approximately 180° apart on the inner edge of an upwardly extending shoulder 34 formed as an integral part of the flange 12. The shoulder 34 surrounds the plate 26 and prevents accidental catching of the edge 31 which would bend the plate away from the surface of the flange 12. The ears may extend over an arc of approximately 10° and the channels 32 for the ears may describe an arc of approximately 40°. With these approximate dimensions the ends of the channels may define stops to limit the rotational movement of the plate to about 30°. It will of course be appreciated that motion of the plate 26 need be no greater than is required to expose and cover the opening in the reel flange.

The inner edge 36 of the plate 26 is disposed within a channel 38 defined by a bezel 40 secured to the flange 12 immediately adjacent the inner hub wall 16. The bezel 40 is in the form of a continuous ring provided with a plurality of parallel pegs 42 extending from one side, which are sized to fit into openings 44 in the flange just outside the hub wall 16. The inner edge 46 of the bezel lies in the plane of the inner surface 48 of the wall 16 when the pins 42 are inserted in the openings 44. The pins may be heat sealed or otherwise permanently secured in the openings 44 to retain the bezel in place on the flanges. Thus as is shown in FIG. 2 the plate 26 is secured in place on the flange 12 by the channels 32 and 38 provided in the shoulder 34 and bezel 40, respectively.

A cavity 50 is formed in the flange 12 at the region of the hub 10 between the inner and outer walls 16 and 18. The cavity 50 underlies the ring or plate 26 and houses a spring 52 clearly shown in FIGS. 3 and 4. The spring 52 is supported in the cavity 50 by its ends 54 and 56 which extend through spaced slots 58 and 60 respectively in the lower wall of the cavity 50. It will be noted in FIGS. 3 and 4, that the end 54 of the spring which extends completely through the slot 58 is bent over to permanently secure that end in place, while the other end 56 of the spring is slidable up and down in the slot 60. The spring 52 cooperates with a catch 62 secured to the bottom of the plate 26 to provide a lock for the plate to retain the plate in one position. In FIGS. 3 and 4 spring 52 is shown to be inclined toward its end 56 and the right angle bend of the spring at its end 56 serves to lock the catch 62 in the position shown in FIG. 4. That is, when the catch 62 in the form of a block secured by any convenient means to the underside of the plate 26 moves from the position shown in FIG. 3 to that shown in FIG. 4 it slides over and drops behind the end 56 of the spring and is held in that position and against the bumper 64 made of Teflon or some other particularly durable plastic material, which is mounted on the end of the cavity 50 adjacent the end 56 of the spring.

To release the catch 62 from behind the end 56 of the spring, a button release 66 is provided on the plate 26. The button includes a stem 68 which passes through the plate 26 and carries a disc 70 disposed within the cavity 50. The disc 70 is disposed above and in contact with spring 52 as shown in FIG. 4 when the catch 62 is locked behind the end 56, and by depressing the button 66, the disc 70 pushes the spring 52 and particularly its end 56 downwardly in the cavity 50 so that the catch 62 is free to slide over the spring 52 and return to the position shown in FIG. 3.

It will be noted in FIG. 3 that when the lock composed of the spring 52, catch 62 and button 66 is open the plate 26 may move freely in a counterclockwise direction as suggested by arrow A, as the spring 52 does not interfere with the catch 62 and disc 70 forming part of the button. When the lock is effectively closed as shown in FIG. 4, the spring 52 serves to urge the button 66 outwardly and prevents it from moving about on its mounting in plate 26.

In FIG. 1 the manner in which the plate 26 serves as a closure for the window 24 in the flange 12 is clearly suggested. In that figure the window 28 in the plate 26 is shown in full lines aligned with the opening 24 in the flange 12 so that access is available to the space between the reel flanges. The window 28 is shown in dotted lines in the position it occupies when the plate 26 serves as a closure for the opening 24 to prevent access to the space between the flanges. When the plate 26 is in the position wherein its opening 28 overlies the opening 24, the plate 26 is free to turn counterclockwise with respect to the flange 12 and will in fact do so as the result of its own inertia when the reel turns clockwise as viewed in FIG. 1. Thus, when the reel of FIG. 1 is placed on a spindle and accelerated in a clockwise direction, the plate 26 lags behind the reel and moves counterclockwise relative to it so that the opening 28 shifts to the position shown in broken lines. The edges of the plate 26 disposed in the channels 32 and 38 enable the plate to turn relative to the flange 12 and no interference with such movement is caused by the spring 52 as it is out of the way as viewed in FIG. 3. When the plate turns counterclockwise relative to the flange 12, the catch 62 depresses the spring 52 slightly and passes over it and locks against the cushion 64 behind the spring end 56. Thus, when the window opening 24 is closed by the plate 26 it is locked closed by the spring 52 and catch 62. When the reel decelerates the catch 62 prevents the plate from moving relative to the flange 12 so that the window does not automatically open. Rather, to open the window it is necessary for an operator to depress the button 66 to lower the spring 52 in the cavity 50 (the end 56 slides deeper into slot 60) so that the catch 62 may then pass over the spring. It will be appreciated that because the button 66 is carried by the plate 26, release of the lock and movement of the plate 26 may be carried out by one finger very simply. The operator by pressing the button 66 moves the spring 52 out of the way of the catch 62 and then with the same finger by exerting a slight clockwise directed force on the button the plate 26 will turn in its channels so that the window 28 overlies the opening 24. The face of the button is slightly concave so that the clockwise force can easily be applied.

Preferably the flange 12 is made of transparent plastic material so that the contents of the reel may be readily viewed through it. If the flange 12 is made of transparent material and the flange 14 is opaque or otherwise clearly distinguishable from it, the flange 12 may readily serve as an indication to the operator how the reel should be mounted on the spindle; that is, the reel should always be mounted with the flange 12 facing the operator. If the flange 12 is made of transparent material a scale 72 may conveniently be provided on its face as suggested in FIG. 1 and should be so oriented on the flange that it is visible through the window 28 when that window is in one of its two normal positions. In FIG. 1, the scale 72 is shown aligned with the window 28 when the plate serves to close the opening 24 in the flange.

The embodiment of FIGS. 6–9 is very similar to that of FIGS. 1–5 but employs a different type of locking mechanism for the plate or ring. Thus, the reel in FIGS. 6–9 includes an upper transparent flange 80, a hub 82 and a plate or ring 84 preferably made of aluminum supported between an inner bezel 86 and a shoulder 88 just as in the preferred embodiment. The plate 84 has an opening 90 adapted to overlie a similarly shaped opening 92 in the flange 80, and the opening 90 may be moved to the position shown in dotted lines in FIG. 6 when the window opening 92 in flange 80 is to be closed.

A slot 94 is cut in the plate 84 just beyond the outer edge of the bezel 86. A detent, in the form of a button 96 carried by the reel flange 80 adjacent the inner wall of the hub 82 and an enlargement 98 at the end of the slot 94, serves to lock the plate 84 in the position wherein it closes the opening 92 in the flange 80. The button 96 is mounted in a recess 100 formed in the flange 80 at the region of the hub, and the button is urged outwardly from the recess by leaf spring 102. The button extends through the slot 94 in the plate 84, and when the plate 84 is turned so that the foot 104 of the button is aligned with the enlargement 98 the spring 102 urges the button upwardly so that it locks in the enlargement. As stated, the button 96 and the enlargement 98 are so oriented on the flange 80 and plate 84 that when the plate moves to the position wherein it closes the opening 92 the plate is locked against movement relative to the flange. To uncover the opening 92 the operator must press the button 96 to move its foot 104 against the bias of the spring 102 out of the enlargement 98, and when so moved the plate may then turn freely on the flange until further movement is stopped by engagement of the button with the other end of the slot 94.

As in the preferred embodiment the closure plate 84 is freely movable on the flange 80 and responds to its own inertia to automatically close the opening 92 in the flange when the reel accelerates. Thus, the operator may manually open the window opening 92 by pressing the button 96 to align the opening 90 in the plate with it. With the window open he can readily take one or more turns of the tape or film about the hub of the reel, and when the machine upon which the reel is used is turned on the opening will automatically close due to the inertia of the plate 84.

Figure 10:
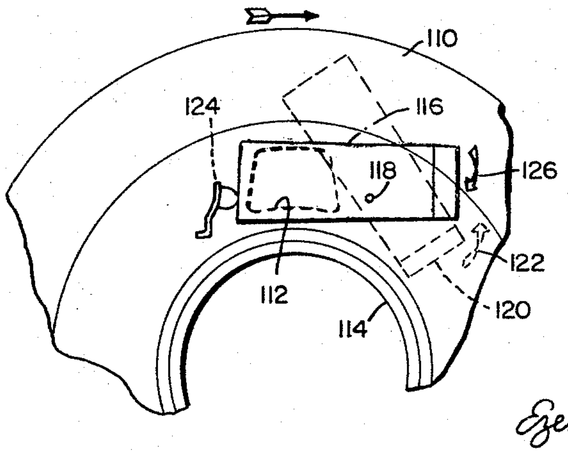
FIG. 10 is a fragmentary side view of another embodiment of a reel constructed in accordance with this invention.

The embodiment of FIG. 10 is provided with a window closure which closes automatically and which may be opened manually by a simple manual manipulation. However, while inertia causes the windows of the other embodiments to close, centrifugal force is relied upon to close the opening in the embodiment of FIG. 10. Thus, the flange 110 of the reel shown is provided with an opening 112 immediately beyond the hub 114, and a plate 116 is pivotally mounted intermediate its ends on the flange by means of pin 118. When the plate is in the position shown in broken lines in FIG. 10 the window opening 112 is exposed and the fingers of the operator may be inserted to wind the film or tape about the hub 114. The plate 116 carries a weight 120 rendering one side of the plate heavier than the other. As a result, when the reel turns clockwise as viewed in FIG. 10 centrifugal force will cause the weighted end of the plate 116 to move outwardly as suggested by arrow 122, and the other end of the plate will cover the window opening 112 when the plate reaches the position shown in full lines. At the same time the latching mechanism 124 will engage the edge of the plate 116 and retain the plate in a locked position over the opening 112. To move the plate in the direction suggested by arrow 126 so as to expose the opening 112, the operator need move the latch 124 against its spring, and he may then swing the plate back to the position shown in broken lines. Thus, it will be recognized that just as in the other embodiments the plate 116 serves as a cover which automatically closes the opening in the reel flange when the reel is turned, and to expose the opening a definite but simple mechanical manipulation is required.

While in each of the embodiments the opening may be exposed by a relatively simple mechanical manipulation, in the embodiment of FIGS. 1–5 this manipulation is conducted most conveniently with one finger of one hand. That is, the single finger which depresses the button 66 may also exert a force to turn the plate, as the button is carried by the plate. In the other embodiments the button or latch employed is carried by the flange and most conveniently is released with one hand while the plate is turned with the other.

Having described several embodiments of this invention in detail those skilled in the art will appreciate that numerous modifications may be made of it without departing from its spirit. For example, while in the embodiments of FIGS. 1 and 6, the closure for the window is shown to be a ring-shaped plate, the plate need not define a complete circle although it is esthetically and functionally preferred. It will also be appreciated that the concept described may be incorporated in reels made of other than plastic materials. Thus while in the embodiments shown, it has been suggested that the plate forming the window closure be made of a lightweight metal such as aluminum, the plate may be made of other materials. A lightweight metal such as aluminum is preferred because it may be extremely thin and still possess sufficient rigidity to avoid bending or other distortion. As yet another modification within the scope of this invention, a small slit or other opening may be provided in the plate covering the window opening and align with that opening when it is closed, if for any reason in proves desirable to allow some circulation of air about the film or tape stored on the reel. The small slit would be too small for an operator to accidentally insert his fingers and therefore would not appreciably detract from the protection otherwise furnished.

Because numerous modifications may be made of this invention without departing from its spirit, we do not intend to limit the breadth of this invention to the specific embodiments illustrated and described. Rather, it is our intention that the scope of this invention be determined by the appended claims and their equivalents.

What is claimed is:

1. A reel comprising
a hub and a pair of spaced flanges,
a bezel mounted on one of the flanges in the region of the hub and having a radially outwardly facing channel,
a second channel provided on the flange and facing radially inwardly toward the channel of the bezel,
an opening in the flange radially beyond the hub and between the two channels,
an arcuate member disposed over the opening and with its inner and outer edges disposed in the channels,
an opening in the arcuate member adapted to overlie the opening in the flange when the member is disposed in one position,
said member closing the flange opening when the member is in a second position,
a cavity provided in the region of the hub beneath the member and between the channels,
a protrusion provided on the member and extending into the cavity,
latching means disposed in the cavity and carried by the member for retaining the member in the second position,
and releasing means carried by and movable with the member for disabling the latching means so that the member may be moved manually to the first position.

2. A reel as defined in claim 1 further characterized by said hub and flanges being made of plastic material and the member being made of aluminum.

3. A reel comprising
a hub and a pair of parallel flanges,
an opening in one of the flanges providing access between the flanges to the hub,
a ring concentric with and mounted on that flange and having an opening provided therein, said ring overlying the opening in the flange,
means provided on the flange enabling the ring to move between a first position wherein its opening overlies and exposes the opening in the flange and a second position wherein the ring closes the opening in the flange,
means operatively associated with the ring and the flange causing the ring to move from the first to the second position automatically in response to movement of the reel,
means including a protrusion carried on the ring and extending toward the hub,
a cavity provided in the hub and into which the protrusion extends as the ring moves between the first and second positions,
a latch disposed in the well and engaging the protrusion when the flange is in the second position,
and means carried by the ring for disabling the latch enabling the ring to be manually moved from the second to the first position.

References Cited by the Examiner

UNITED STATES PATENTS

| | | | |
|---|---|---|---|
| 872,113 | 11/07 | Enders | 242—71.8 |
| 2,271,326 | 1/42 | Bird | 242—71.8 |
| 2,652,918 | 9/53 | Lippert | 242—74 |
| 2,862,678 | 12/58 | Kaden | 242—71.8 |
| 3,105,655 | 10/63 | Park | 242—118.7 |

JORDAN FRANKLIN, *Primary Examiner.*